United States Patent
Keller et al.

(10) Patent No.: US 11,429,454 B2
(45) Date of Patent: Aug. 30, 2022

(54) CLOUD RESOURCE UTILIZATION MANAGEMENT

(71) Applicant: CITRIX SYSTEMS, INC., Burlington, MA (US)

(72) Inventors: Steven A. Keller, Coral Springs, FL (US); Sindy Giraldo, Fort Lauderdale, FL (US)

(73) Assignee: CITRIX SYSTEMS, INC., Ft. Lauderdale, FL (US)

( * ) Notice: Subject to any disclaimer, the term of this patent is extended or adjusted under 35 U.S.C. 154(b) by 0 days.

(21) Appl. No.: 16/834,763

(22) Filed: Mar. 30, 2020

(65) Prior Publication Data

US 2021/0303367 A1 Sep. 30, 2021

(51) Int. Cl.
*G06F 9/50* (2006.01)
*G06F 9/455* (2018.01)

(52) U.S. Cl.
CPC ........ *G06F 9/5077* (2013.01); *G06F 9/45558* (2013.01); *G06F 9/505* (2013.01); *G06F 9/5072* (2013.01); *G06F 2009/4557* (2013.01); *G06F 2209/508* (2013.01); *G06F 2209/5011* (2013.01)

(58) Field of Classification Search
CPC .... G06F 9/5077; G06F 9/45558; G06F 9/505; G06F 9/5072; G06F 2009/4557; G06F 2209/5011; G06F 2209/508
See application file for complete search history.

(56) References Cited

U.S. PATENT DOCUMENTS

| | | | |
|---|---|---|---|
| 6,990,666 B2 | 1/2006 | Hirschfeld et al. | |
| 8,738,972 B1 * | 5/2014 | Bakman | G06F 11/3442 714/47.2 |
| 9,122,562 B1 | 9/2015 | Stickle | |
| 9,489,647 B2 | 11/2016 | Martinez et al. | |
| 2014/0019965 A1 * | 1/2014 | Neuse | G06F 9/5088 718/1 |
| 2016/0162315 A1 * | 6/2016 | Pannem | G06F 9/45558 718/1 |
| 2019/0303118 A1 | 10/2019 | Avinash Dorle et al. | |
| 2020/0404051 A1 * | 12/2020 | Guniguntala | H04L 67/2809 |

OTHER PUBLICATIONS

Extended European Search Report for EP Application No. 21165739.0, dated Jul. 21, 2021, 10 pages.

\* cited by examiner

*Primary Examiner* — Sisley N Kim
(74) *Attorney, Agent, or Firm* — Mintz Levin Cohn Ferris Glovsky and Popeo, P.C.

(57) ABSTRACT

Data is received characterizing a plurality of virtual resources executing application code and deployed within a remote computing environment. The remote computing environment is providing a first configuration of computing resources for execution of the plurality of virtual resources. Resource consumption information associated with the plurality of virtual resources is monitored via an application programing interface of the remote computing environment. A second configuration of computing resources for the plurality of virtual resources is determined using a set of rules and the resource consumption information. A request is transmitted to the remote computing environment to provide the second configuration of computing resources for execution of the plurality of virtual resources. Related apparatus, systems, techniques and articles are also described.

21 Claims, 5 Drawing Sheets

CLOUD RESOURCE UTILIZATION MANAGEMENT

TECHNICAL FIELD

The subject matter described herein relates to managing use of cloud resources.

BACKGROUND

Cloud computing can include the on-demand availability of computer system resources, especially data storage and computing power, without direct active management by the user. The term can be generally used to describe data centers available to many users over the Internet. Large clouds often have functions distributed over multiple locations from central servers.

Some cloud computing providers can allow for scalability and elasticity via dynamic (e.g., "on-demand") provisioning of resources on a fine-grained, self-service basis. This can provide cloud computing users the ability to scale up when the usage need increases or down if resources are not being used.

SUMMARY

In an aspect, data is received characterizing a plurality of virtual resources executing application code and deployed within a remote computing environment. The remote computing environment is providing a first configuration of computing resources for execution of the plurality of virtual resources. Resource consumption information associated with the plurality of virtual resources is monitored via an application programing interface of the remote computing environment. A second configuration of computing resources for the plurality of virtual resources is determined using a set of rules and the resource consumption information. A request is transmitted to the remote computing environment to provide the second configuration of computing resources for execution of the plurality of virtual resources.

One or more of the following features can be included in any feasible combination. For example, the monitoring can be performed while the remote computing environment is providing the first configuration of computing resources for execution of the plurality of virtual resources. The second configuration of computing resources can include changing an allocation of the computing resources relative to the first configuration of computing resources. The second configuration of computing resources can include modifying a type of resource utilized within the remote computing environment relative to the first configuration of computing resources. An alert can be transmitted indicating an overutilization of the computing resources by the plurality of virtual resources. The determining can include determining a type of remote computing environment as a test environment, a staging environment, and/or a production environment. The set of rules can include a condition and an action to be provided in response to the condition evaluating as true.

The resource consumption information can include utilization information, resource information, and cost information. The utilization information can characterize an amount of resources utilized by the plurality of virtual resources. The resource information can characterize a value of a characteristic of the first configuration of computing resources provided by the remote computing environment. The cost information can characterize a cost per unit of a resource.

The determining can include determining a ratio of cost versus utilization for the first configuration. The plurality of virtual resources can include virtual machines, storage accounts, web applications, databases, and/or virtual networks. The remote computing environment can include an infrastructure as a service platform configured to provide application programming interfaces and supporting pools of hypervisors including virtual machines, the application programming interfaces enabling provision of processing, storage, and/or networks to support operating systems and/or applications.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
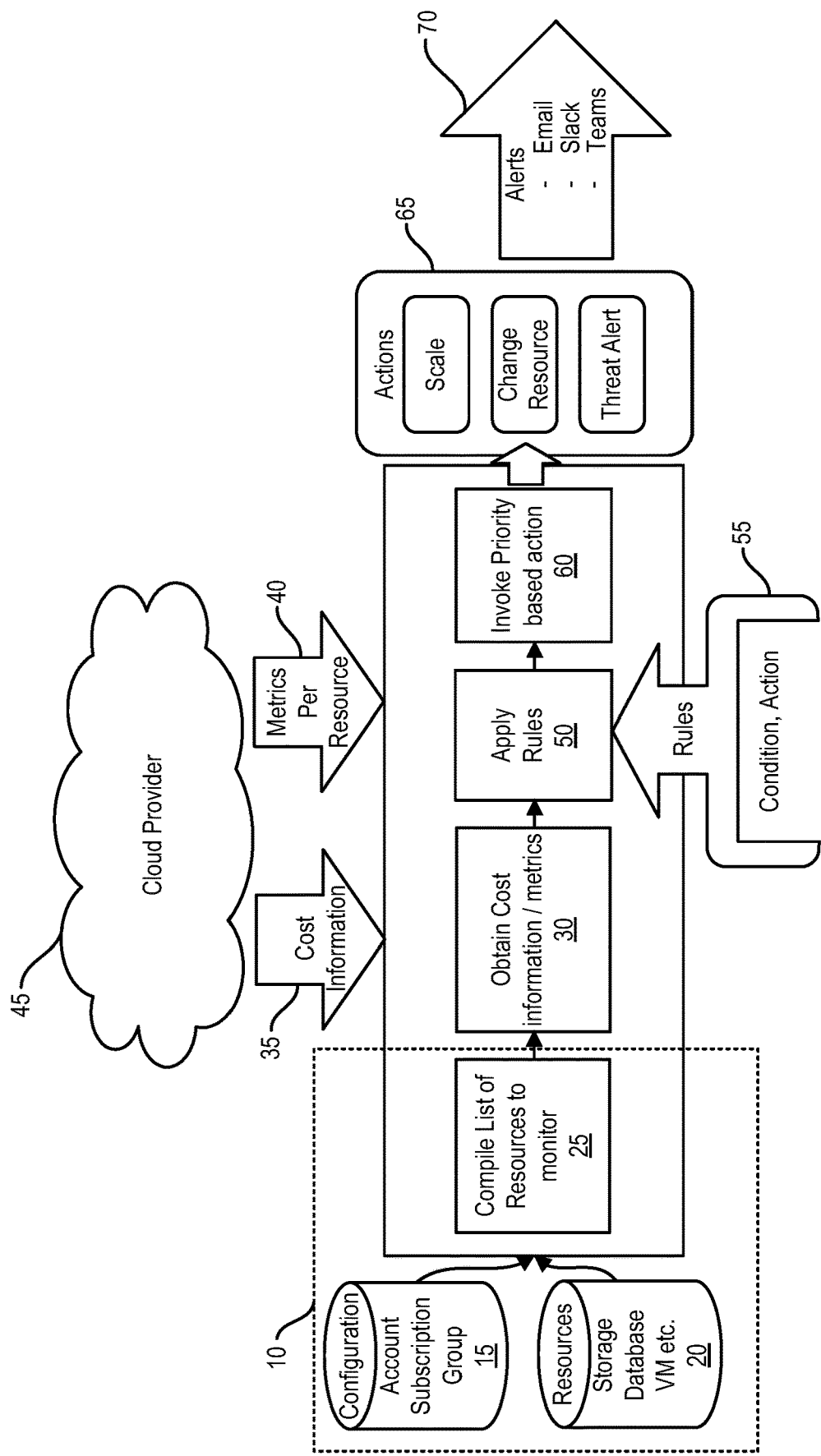
FIG. 1 is a data flow diagram illustrating an example data flow for a process of monitoring existing cloud resource consumption and, based on the monitoring, determine one or more actions to modify the cloud resource allocation to account for a predicted change in consumption and/or modify which resources are utilized to improve utilization efficiency.

Cloud providers can provide a remote computing environment, for example, with virtual machine (VM) infrastructure such as a hypervisor using native execution to share and manage hardware, allowing for multiple environments which are isolated from one another, yet exist on the same physical machine. The computing environment can include an infrastructure as a service (IaaS) platform that provides application programming interfaces (APIs) to dereference low-level details of underlying network infrastructure. In such an IaaS platform, pools of hypervisors can support large numbers of VMs and include the ability to scale up and down services to meet varying needs. IaaS platforms can provide the capability to the user to provision processing, storage, networks, and other fundamental computing resources where the user is able to deploy and run arbitrary software, which can include operating systems and applications. The user may not manage or control the underlying cloud infrastructure but has control over operating systems, storage, and deployed applications; and possibly limited control of select networking components (e.g., host firewalls).

Cloud resource costs vary based on utilization of the underlying computing resource such as the required percent of central processing unit (CPU) processing time. Prior to deployment of a resource, such as a virtual machine, storage accounts, web applications, databases, virtual networks, and the like, the consumer of the resource requests an amount of resources for a given time period. For example, the consumer may request an amount of physical CPU utilization and number of virtual machines. The cloud provider will then charge a pre-negotiated price for allocating such resources.

But if the consumer does not actually use the requested and allocated physical resources, they must still pay for the allocation. Moreover, because the physical computing resources are idle as a result of the underutilization, the physical resources are effectively wasted as they could be utilized for another process.

Accordingly, some implementations of the current subject matter include an approach to monitoring existing cloud resource consumption and, based on the monitoring, determine one or more actions to modify the cloud resource allocation to account for a predicted change in consumption and/or modify which resources are utilized to improve utilization efficiency. In some implementations, the modifications can be performed as a zero down-time operation such that any deployed service supported by and/or implemented by the cloud resource is uninterrupted. By predicting a cloud resource utilization and determining whether a change in resources being utilized would improve efficiency, cloud resource utilization can be improved and costs can be lowered.

In some implementations, the monitoring can including receiving and/or accessing real time utilization information, operational characteristics (sometimes referred to as metrics) information, and cost information. A set of rules can be applied to the information to determine actions to take. In some implementations, any number of actions can be defined and the actions can include increasing or decreasing scaling, changing a resource stock keeping unit (SKU) of the allocated resources (e.g., changing a type of resource), and/or highlighting resources that are out of compliance. In some implementations, application of the rules can be prioritized.

One example of a resource being out of compliance can include the cloud provider having certain requirements, such as Azure has certain requirements that drive service level agreements (SLAs), for example, resources in a development or test environment may have different requirements than those in a production environment. If a production resource is detected that does not meet the requirement, it can be considered out of compliance and an alert could be generated. For example, a service fabric cluster can have durability and reliability settings that in development and test (e.g., Bronze) is acceptable, in a staging environment (e.g., Silver) is acceptable and in production (e.g., Gold) is acceptable. The levels can determine the high availability characteristics.

In addition to scaling (e.g., increasing or decreasing) allocated resources and modifying resource types, some implementations of the current subject matter can generate alerts based on the monitoring, such as high utilization alerts, which can enable the user (e.g., administrator or application provider) to take action prior to a failure or interruption in service.

As described herein, a resource (also referred to as a virtual resource) can include any manageable item that is available through a cloud provider such as virtual machines, storage accounts, web applications, databases, and virtual networks. Other resource types are possible.

FIG. 1 is a data flow diagram illustrating an example data flow 100 for a process of monitoring existing cloud resource consumption and, based on the monitoring, determine one or more actions to modify the cloud resource allocation to account for a predicted change in consumption and/or modify which resources are utilized to improve utilization efficiency. By predicting a cloud resource utilization and determining whether a change in resources being utilized would improve efficiency, cloud resource utilization can be improved and costs can be lowered.

At 10, data characterizing the scope of resources to be monitored can be received. The data can include, for example, subscription information, account information, and resource group information associated with a remote computing environment (e.g., a cloud provider). One or more virtual resources, such as virtual VMs, may be deployed to the cloud provider such that the virtual resources are executing application code on physical hardware resources managed by the cloud provider. The cloud provider can be providing a first configuration of computing resources for execution of the virtual resources. For example, the cloud provider can have allocated a certain pre-agreed amount of units of computing resources (e.g., number of VMs, percent of CPU time, disk storage size, and the like) to the one or more VMs to support operation of the VMs within the cloud provider's computing environment.

The account information can include a cloud-based identity and relate to an access management service of the cloud provider. The account information can include information that enables users of the cloud provider (e.g., information technology (IT) administrators, application developers, etc.) to access (e.g., sign into) the cloud provider and access resources. For example, the account information can relate to a user with a username and password, applications or other servers that might require authentication through secret keys or certificates, and the like.

The subscription information can relate to services for paying the cloud provider for cloud services. In some implementations, many subscriptions can be associated with an account, and each subscription can be linked to a form of payment. Each subscription can have a trust relationship with an account and multiple subscriptions can trust the same account.

The resource group information can relate to a logical grouping of resources within the cloud provider system. A resource group can include a container that holds related resources for a given cloud solution. These associations of resources enable an administrator to manage resources as a group. Resource group information can enable an administrator to apply permissions to manage resources through roles related to the cloud provider.

In some implementations, at 15, the account information, the subscription information, and the group resource information can be read from a configuration database. In some implementations, tags and/or labels can also be read from the configuration database. For example, some cloud providers (such as Microsoft Azure and Amazon Web Services) provide the ability to tag or label a resource, where a tag or label can be considered to be a name value pair. In some implementations, the configuration can apply to any resources with a particular tag or label value in addition to account, subscription, group.

In some implementations, at 20, supported resource information such as reference of resource type, operations to be monitored, process control parameters, and action definitions can be read from a resources database 20. Examples of resource types, operations to be monitored, process control parameters and actions are described more fully below.

In some implementations, at 25, the configuration information (e.g., the account information, subscription information, and the resource group information) and the resource information (e.g., reference of resource type, operations to be monitored, process control parameters, and action definitions) can be analyzed to compile a set or list of resources being provided by a given cloud provider at a given time.

At 30, cost, utilization, and operational characteristics (e.g., metrics) per resource can be obtained. The cost and operational characteristics can be periodically obtained from one or more cloud providers via respective Representational state transfer (REST) application programming interfaces (APIs), as illustrated at 35, 40. Obtaining the cost and operational characteristics can include monitoring, via an application programing interface of the remote computing environment, resource consumption information associated with the plurality of virtual resources. Because the cost, utilization, and operational characteristics are monitored, some implementations of the current subject matter allow for real-time governance of cloud resources using current, up to date, information.

Cost information can include cost per unit of each resource. For example, the following illustrates example cost and resource utilization consumption information.

[
{
  "Meter Category": "Storage",
  "Meter Name": "Disk Operations",
  "Consumed Quantity": "171.05959999999999",
  "ResourceRate": "1.999973290336E-3",
  "ExtendedCost": "0.34211463105552098",
  "Resource Location": "usgovvirginia",
  "Unit Of Measure": "100000000"
},
{
  "Meter Category": "Azure Cosmos DB", -continued "Meter Name": "100 RU/s",
  "Consumed Quantity": "72",
  "ResourceRate": "0.01",
  "ExtendedCost": "0.72",
  "Resource Location": "usgovtexas",
  "Unit Of Measure": "1000 /Hour"
},
{
  "Meter Category": "Bandwidth",
  "Meter Name": "Data Transfer Out",
  "Consumed Quantity": "0.24579599999999999",
  "ResourceRate": "6.19631195729180002E-2",
  "ExtendedCost": "1.5230286938545E-2",
  "Resource Location": "usgovvirginia",
  "Unit Of Measure": "10 GB"
},
{
  "Meter Category": "Virtual Network",
  "Meter Name": "Dynamic Public IP",
  "Consumed Quantity": "12",
  "ResourceRate": "4.999949323126E-3",
  "ExtendedCost": "5.99993918775110001E-2",
  "Resource Location": "usgovvirginia",
  "Unit Of Measure": "200 Hours"
},
{
  "Meter Category": "Storage",
  "Meter Name": "LRS Data Stored",
  "Consumed Quantity": "2.5198000000000002E-2",
  "ResourceRate": "5.6195174823743997E-2",
  "ExtendedCost": "1.41600060152089999E-3",
  "Resource Location": "usgovvirginia",
  "Unit Of Measure": "100 GB/Month"
},
{
  "Meter Category": "Virtual Network",
  "Meter Name": "Dynamic Public IP",
  "Consumed Quantity": "12",
  "ResourceRate": "4.999949323126E-3",
  "ExtendedCost": "5.99993918775110001E-2",
  "Resource Location": "usgovvirginia",
  "Unit Of Measure": "200 Hours"
},
{
  "Meter Category": "Cloud Services",
  "Meter Name": "D2 v2",
  "Consumed Quantity": "51",
  "ResourceRate": "0.30699987775066001",
  "ExtendedCost": "15.6569937652836",
  "Resource Location": "usgovvirginia",
  "Unit Of Measure": "10 Hours"
}
]

Operational characteristics (e.g., metrics) per resource can include a series of measured values and counts that are collected and stored over time. Some cloud providers can provide standard (or "platform") metrics as well as custom metrics. Metrics can generally reflect the health and usage statistics of cloud resources. Custom metrics can generally refer to metrics generated by applications operating on the cloud resources. As an example, operational characteristics information can include time series data specifying the time the value was collected, the resource the value is associated with, a namespace that acts like a category for the metric, a metric name, and a value. The value may be multi-dimensional. Example metrics per resource can include network throughput, memory usage, private bytes, virtual bytes, total connection requests, successful connections per second, total connection failures, current user sessions, and the like.

Once cost, utilization consumption, and metrics are obtained, at 50, a set of rules can be applied to the cost, utilization consumption, and operational characteristics. Applying the set of rules at 50 can include determining, using the set of rules and the accessed resource consumption information, another configuration of computing resources for the plurality of virtual resources. This new configuration of resources can be different than the currently allocated resources.

Each rule can include one or more conditions and actions to take (when the conditions evaluate as true) that can automatically perform an action such as scale resources (e.g., increasing or decreasing an allocation of the computing resources relative to the current configuration of computing resources), change the SKU of a resource being used (e.g., modifying a type of a resource being utilized relative to the current configuration of computing resources), and provide high utilization alerts (e.g. to identify potential threats).

Because different types of environments can have different operational constraints, in some implementations, rules can be organized by whether the environment is a test environment, staging environment, or production environment. Accordingly, applying the set of rules at 50 can include determining a type of the cloud environment (e.g., remote computing environment) as a test environment, a staging environment, and/or a production environment.

One example action can include a change in the type of resource being utilized. For example, a rule in the set of rules can cause an SKU change. An SKU change can occur, for example, if utilization of a resource such as Virtual Machine (VM) has a measurable characteristic (e.g., CPU utilization) that is very high/low then a recommendation can be made. For example, if CPU average utilization is less than 10% then an action can be taken. To determine the action, the current resource SKU, can be used to determine a family of resources that can be utilized. Then, based on measured characteristics, a list of new resources with more appropriate characteristics (e.g., more or less CPU cores, random access memory (RAM), or disk space) can be generated and utilized to provide a recommendation. For example, a change based on a sustained average CPU less than 10% can result in a recommendation to take an action, with the action including an alert (email, slack, teams, and the like) indicating usage is less than 10% and the recommendation can include finding a new SKU with less CPU core.

In some implementations, the possible actions can be weighted based on current pricing information and taking into consideration any specially negotiated prices on certain SKU, reserved instances (e.g., pre-purchased quantities of a given resource) purchased, resource location (e.g., since the same resource in a different region can also impact cost), targeted environment (e.g., whether target environment is development or test environments, alternate regions or burstable resources can be utilized, which cost less, in contrast a production environment can be more focused on customer experience and may have stricter requirements), and the like.

In some cases, the overall cost may be able to be impacted by scaling a resource that already exists (e.g., increasing or decreasing an allocation for an existing resource). In some cases, like a Cosmos database, a structured query language (SQL) database, and clusters, cost can be impacted by adjusting the current quantity of the item being reserved, for example, the amount of request units (RU), database throughput units (DTU), and scaleset size (e.g., number of VMs in a cluster) can be scaled (e.g., increased or decreased).

Example rules and recommended actions can include:

| Resource type | Rules | Recommended Action |
| --- | --- | --- |
| Virtual Machine | CPU utilization on average is greater than 10% and less than 75% (of the available processing units); Time out of range to trigger action is 4 hours | Recommend SKU with more/less cores |
| Virtual Machine | CPU utilization on average is greater than 10% and less than 75% (of the available processing units); Time out of range to trigger action is 1 day | Recommend SKU for more/less RAM |
| CosmosDB | RU measurements +− 100 of current allocation; Time out of range to trigger action is 10 minutes | Automatically scale the CosmosDB to higher/lower RU |
| Development Environment | Virtual machine SKU should be within particular list; Time out of range is 1 day | Recommend SKU (and notify owner) |

In some implementations, at 55, the rules may be accessed, e.g., from a database or user.

At 60, the determined actions can be invoked. For example, the determined actions can be processed to determine a new configuration of computing resources that would result in more efficient use of computing resources, lower cost, and the like. The processing of the rules can be performed according to a predetermined prioritization of the rules, for example, via a rules engine. The prioritization may be user specified. A request can be transmitted to the cloud provider 45 (e.g., remote computing environment) to provide the second configuration of computing resources.

The actions can, at 65, be implemented by either the cloud provider 45 and/or via an alert channel 70, such as email, slack, and the like. The cloud provider 45 can then implement the request to effect the actions including modifying the deployed resources according to the second configuration. In some implementations, the modifications can be performed as a zero down-time operation such that any deployed service supported by and/or implemented by the cloud resource is uninterrupted. For example, a scaling operation can be performed with zero down time. For example, the number of resource units available for a database (such as Azure CosmosDB) can be increased or decreased at runtime without affecting operation. As another example, a service fabric cluster can be scaled (e.g., the number of VMs in the cluster can be increased or decreased) and this can be performed without downtime of services running in the cluster.

In some implementations, an additional recommendation engine can be included that takes the current characteristics (e.g., 4 core) and suggests to the user that they look for a different SKU, for example, an SKU that has the same memory (for example, RAM e.g., 8G) and storage (e.g., 50 GB) and lower CPU (e.g., 2 cores). In some implementations, the recommendation engine can consider current prices list as a 4 core model may be chosen because there is a special price making it less that the 2 core model. In such a case the recommendation, may not be delivered. As another example, in an instance where a 4 core machine being used and CPU utilization is consistently <10%, the action can include an email or slack message indicating that the particular resource has consistent usage <10% and to consider using a SKU with less CPU.

In some implementations, the subject matter described herein may provide technical advantages. For example, in some implementations the current subject matter can provide a mechanism to scale various aspects of an application by altering the cloud resources being used by the application. In some cases this can be by recommendations via alerts and/or can be by making changes to the resources. In some implementations, a budgeting rule can be added that can stop resources if limits are reached (e.g., not production but developer resources). As another example, in some implementations, alerts can be raised when items in a developer environment is provisioned using production settings (e.g., a gold cluster instead of a bronze cluster), which can be significantly more expensive. As another example, some implementations can provide a mechanism to enable a number of different alerting scenarios.

Figure 2:
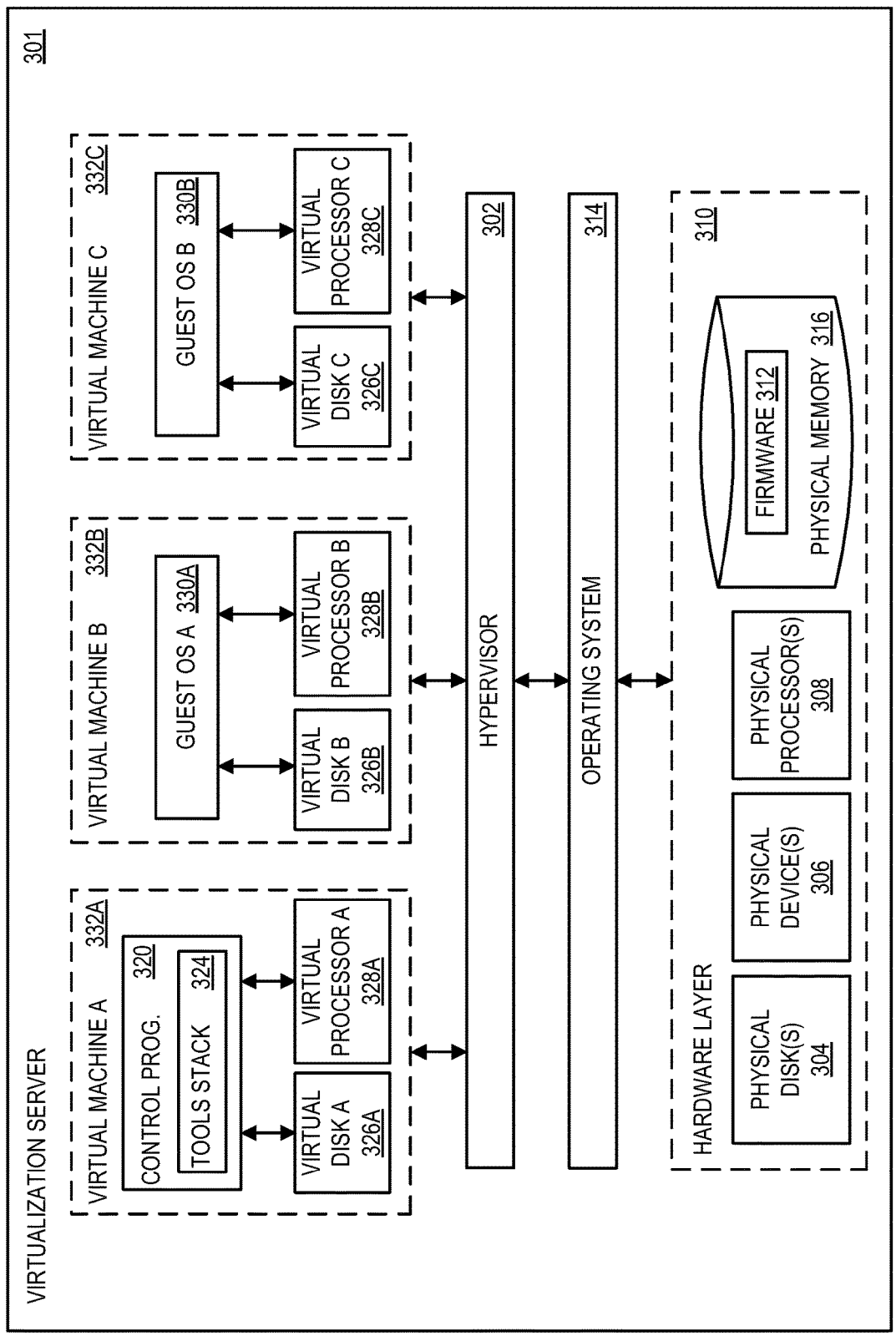
FIG. 2 shows a high-level architecture of an illustrative virtualization system.

FIG. 2 shows a high-level architecture of an illustrative virtualization system that can enable a process of monitoring existing cloud resource consumption and, based on the monitoring, determine one or more actions to modify the cloud resource allocation to account for a predicted change in consumption and/or modify which resources are utilized to improve utilization efficiency. By predicting a cloud resource utilization and determining whether a change in resources being utilized would improve efficiency, cloud resource utilization can be improved and costs can be lowered. As shown, the virtualization system may be a single-server or multi-server system, or a cloud system, including at least one virtualization server 301 configured to provide virtual desktops and/or virtual applications to one or more client access devices 102a-c. As used herein, a desktop may refer to a graphical environment (e.g., a graphical user interface) or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per physical device) or virtual (e.g., many instances of an OS running on a single physical device). Each application may be executed on a local device, or executed on a remotely located device (e.g., remoted).

Virtualization server 301 may be configured as a virtualization server in a virtualization environment, for example, a single-server, multi-server, or cloud computing environment. Virtualization server 301 illustrated in FIG. 2 may be deployed as and/or implemented by one or more embodiments of server 106 illustrated in FIG. 3A or by other known computing devices. Included in virtualization server 301 is hardware layer 310 that may include one or more physical disks 304, one or more physical devices 306, one or more physical processors 308, and one or more physical memories 316. In some embodiments, firmware 312 may be stored within a memory element in physical memory 316 and be executed by one or more of physical processors 308. Virtualization server 301 may further include operating system 314 that may be stored in a memory element in physical memory 316 and executed by one or more of physical processors 308. Still further, hypervisor 302 may be stored in a memory element in physical memory 316 and be executed by one or more of physical processors 308. Presence of operating system 314 may be optional such as in a case where the hypervisor 302 is a Type A hypervisor.

Executing on one or more of physical processors 308 may be one or more virtual machines 332A-C (generally 332). Each virtual machine 332 may have virtual disk 326A-C and virtual processor 328A-C. In some embodiments, first virtual machine 332A may execute, using virtual processor 328A, control program 320 that includes tools stack 324. Control program 320 may be referred to as a control virtual machine, Domain 0, Dom0, or other virtual machine used for system administration and/or control. In some embodiments, one or more virtual machines 332B-C may execute, using virtual processor 328B-C, guest operating system 330A-B (generally 330).

Physical devices 306 may include, for example, a network interface card, a video card, an input device (e.g., a keyboard, a mouse, a scanner, etc.), an output device (e.g., a monitor, a display device, speakers, a printer, etc.), a storage device (e.g., an optical drive), a Universal Serial Bus (USB) connection, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in hardware layer 310 may include any type of memory. Physical memory 316 may store data, and in some embodiments may store one or more programs, or set of executable instructions. FIG. 2 illustrates an embodiment where firmware 312 is stored within physical memory 316 of virtualization server 301. Programs or executable instructions stored in physical memory 316 may be executed by the one or more processors 308 of virtualization server 301.

Virtualization server 301 may also include hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 may be any combination of executable instructions and hardware that monitors virtual machines 332 executing on a computing machine. Hypervisor 302 may be a Type 2 hypervisor, where the hypervisor executes within operating system 314 executing on virtualization server 301. Virtual machines may then execute at a layer above hypervisor 302. In some embodiments, the Type 2 hypervisor may execute within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on virtualization server 301 by directly accessing the hardware and resources within hardware layer 310. That is, while Type 2 hypervisor 302 accesses system resources through host operating system 314, as shown, a Type 1 hypervisor may directly access all system resources without host operating system 314. A Type 1 hypervisor may execute directly on one or more physical processors 308 of virtualization server 301, and may include program data stored in physical memory 316.

Hypervisor 302, in some embodiments, may provide virtual resources to guest operating systems 330 or control programs 320 executing on virtual machines 332 in any manner that simulates operating systems 330 or control programs 320 having direct access to system resources. System resources can include, but are not limited to, physical devices 306, physical disks 304, physical processors 308, physical memory 316, and any other component included in hardware layer 310 of virtualization server 301. Hypervisor 302 may be used to emulate virtual hardware, partition physical hardware, virtualize physical hardware, and/or execute virtual machines that provide access to computing environments. In still other embodiments, hypervisor 302 may control processor scheduling and memory partitioning for virtual machine 332 executing on virtualization server 301. Examples of hypervisor 302 may include those manufactured by VMWare, Inc., of Palo Alto, Calif.; Xen Project® hypervisor, an open source product whose development is overseen by the open source XenProject.org community; Hyper-V®, Virtual Server®, and Virtual PC® hypervisors provided by Microsoft Corporation of Redmond, Wash.; or others. The virtualization server 301 may execute hypervisor 302 that creates a virtual machine platform on which guest operating systems 330 may execute. When this is the case, virtualization server 301 may be referred to as a host server. An example of such a virtualization server is Citrix Hypervisor® provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create virtual machine 332. The virtual machine image may refer to a collection of data, states, instructions, etc. that make up an instance of a virtual machine. In other embodiments, hypervisor 302 may execute guest operating system 330 within virtual machine 332. In still other embodiments, virtual machine 332 may execute guest operating system 330.

In addition to creating virtual machines 332, hypervisor 302 may control the execution of at least one virtual machine 332. The hypervisor 302 may present at least one virtual machine 332 with an abstraction of at least one hardware resource provided by virtualization server 301 (e.g., any hardware resource available within hardware layer 310). In some implementations, hypervisor 302 may control the manner in which virtual machines 332 access physical processors 308 available in virtualization server 301. Controlling access to physical processors 308 may include determining whether virtual machine 332 should have access to processor 308, and how physical processor capabilities are presented to virtual machine 332.

As shown in FIG. 2, the virtualization server 301 may host or execute one or more virtual machines 332. Virtual machine 332 may be a set of executable instructions and/or user data that, when executed by processor 308, may imitate the operation of a physical computer such that virtual machine 332 can execute programs and processes much like a physical computing device. While FIG. 2 illustrates an embodiment where virtualization server 301 hosts three virtual machines 332, in other embodiments virtualization server 301 may host any number of virtual machines 332. Hypervisor 302 may provide each virtual machine 332 with a unique virtual view of the physical hardware, including memory 316, processor 308, and other system resources 304, 306 available to that virtual machine 332. The unique virtual view may be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor, and other system resources available to virtual machines 332.

Each virtual machine 332 may include virtual disk 326A-C (generally 326) and virtual processor 328A-C (generally 328.) Virtual disk 326 may be a virtualized view of one or more physical disks 304 of virtualization server 301, or a portion of one or more physical disks 304 of virtualization server 301. The virtualized view of physical disks 304 may be generated, provided, and managed by hypervisor 302. In some embodiments, hypervisor 302 may provide each virtual machine 332 with a unique view of physical disks 304. These particular virtual disk 326 (included in each virtual machine 332) may be unique, when compared with other virtual disks 326.

Virtual processor 328 may be a virtualized view of one or more physical processors 308 of virtualization server 301. The virtualized view of physical processors 308 may be generated, provided, and managed by hypervisor 302. Virtual processor 328 may have substantially all of the same characteristics of at least one physical processor 308. Virtual processor 308 may provide a modified view of physical processors 308 such that at least some of the characteristics of virtual processor 328 are different from the characteristics of the corresponding physical processor 308.

Figure 3A:
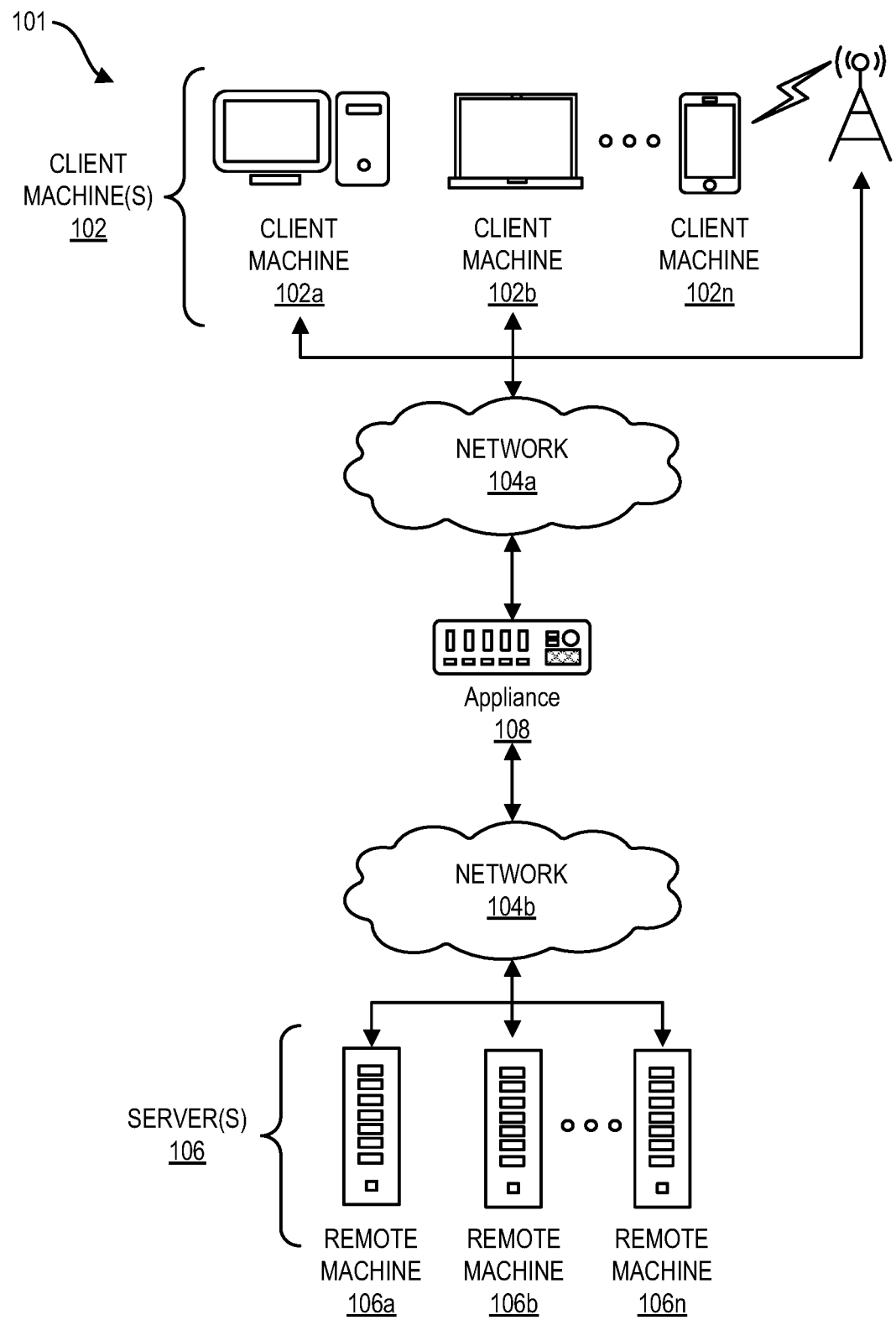
FIG. 3A depicts a network diagram illustrating an example of a network environment, in accordance with some example embodiments.

FIG. 3A depicts a network diagram illustrating an example of a network environment 101, that can enable a process of monitoring existing cloud resource consumption and, based on the monitoring, determine one or more actions to modify the cloud resource allocation to account for a predicted change in consumption and/or modify which resources are utilized to improve utilization efficiency. Referring to FIG. 3A, the network environment 101 in which various aspects of the disclosure can be implemented can include one or more clients 102a-102n, one or more remote machines 106a-106n, one or more networks 104a and 104b, and one or more appliances 108 installed within the network environment 101. The clients 102a-102n communicate with the remote machines 106a-106n via the networks 104a and 104b.

The clients 102a-102n can communicate with the remote machines 106a-106n via an appliance 108. The illustrated appliance 108 is positioned between the networks 104a and 104b, and can also be referred to as a network interface or gateway. The appliance 108 can operate as an application delivery controller (ADC) to provide clients with access to business applications and other data deployed in a datacenter, the cloud, or delivered as Software as a Service (SaaS) across a range of client devices, and/or provide other functionality such as load balancing and/or the like. Multiple appliances 108 can be used, and the appliance(s) 108 can be deployed as part of the network 104a and/or 104b.

The clients 102a-102n can be generally referred to as client machines, local machines, clients, client nodes, client computers, client devices, computing devices, endpoints, or endpoint nodes. The clients 102a-102n can include, for example, the first client 110a, the second client 110b, and/or the like. The remote machines 106a-106n can be generally referred to as servers or a server farm. The client 102 can have the capacity to function as both a client node seeking access to resources provided by a server 106 and as a server 106 providing access to hosted resources for other clients 102a-102n. The networks 104a and 104b can be generally referred to as a network 104. The network 104 including the networks 104a and 104b can be configured in any combination of wired and wireless networks.

The servers 106 can include any server type of servers including, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality. The servers 106 can include, for example, the server 120, the proxy server 130, the resource server 140, and/or the like.

A server 106 can execute, operate or otherwise provide an application that can be any one of the following: software; a program; executable instructions; a virtual machine; a hypervisor; a web browser; a web-based client; a client-server application; a thin-client computing client; an ActiveX control; a Java applet; software related to voice over internet protocol (VoW) communications like a soft internet protocol telephone; an application for streaming video and/or audio; an application for facilitating real-time-data communications; a hypertext transfer protocol (HTTP) client; a file transfer protocol (FTP) client; an Oscar client; a Telnet client; or any other set of executable instructions.

The server 106 can execute a remote presentation services program or other program that uses a thin-client or a remote-display protocol to capture display output generated by an application executing on a server 106 and transmit the application display output to a client 102.

The server 106 can execute a virtual machine providing, to a user of a client 102, access to a computing environment. The client 102 can be a virtual machine. The virtual machine can be managed by, for example, a hypervisor, a virtual machine manager (VMM), or any other hardware virtualization technique within the server 106. The virtual machine can be deployed within a cloud provider, for example, as described above with respect to FIG. 1.

The network 104 can be a local-area network (LAN), a metropolitan area network (MAN), a wide area network (WAN), a primary public network, and/or a primary private network. Additional embodiments can include one or more mobile telephone networks that use various protocols to communicate among mobile devices. For short-range communications within a wireless local-area network (WLAN), the protocols can include 802.11, Bluetooth, and Near Field Communication (NFC).

Figure 3B:
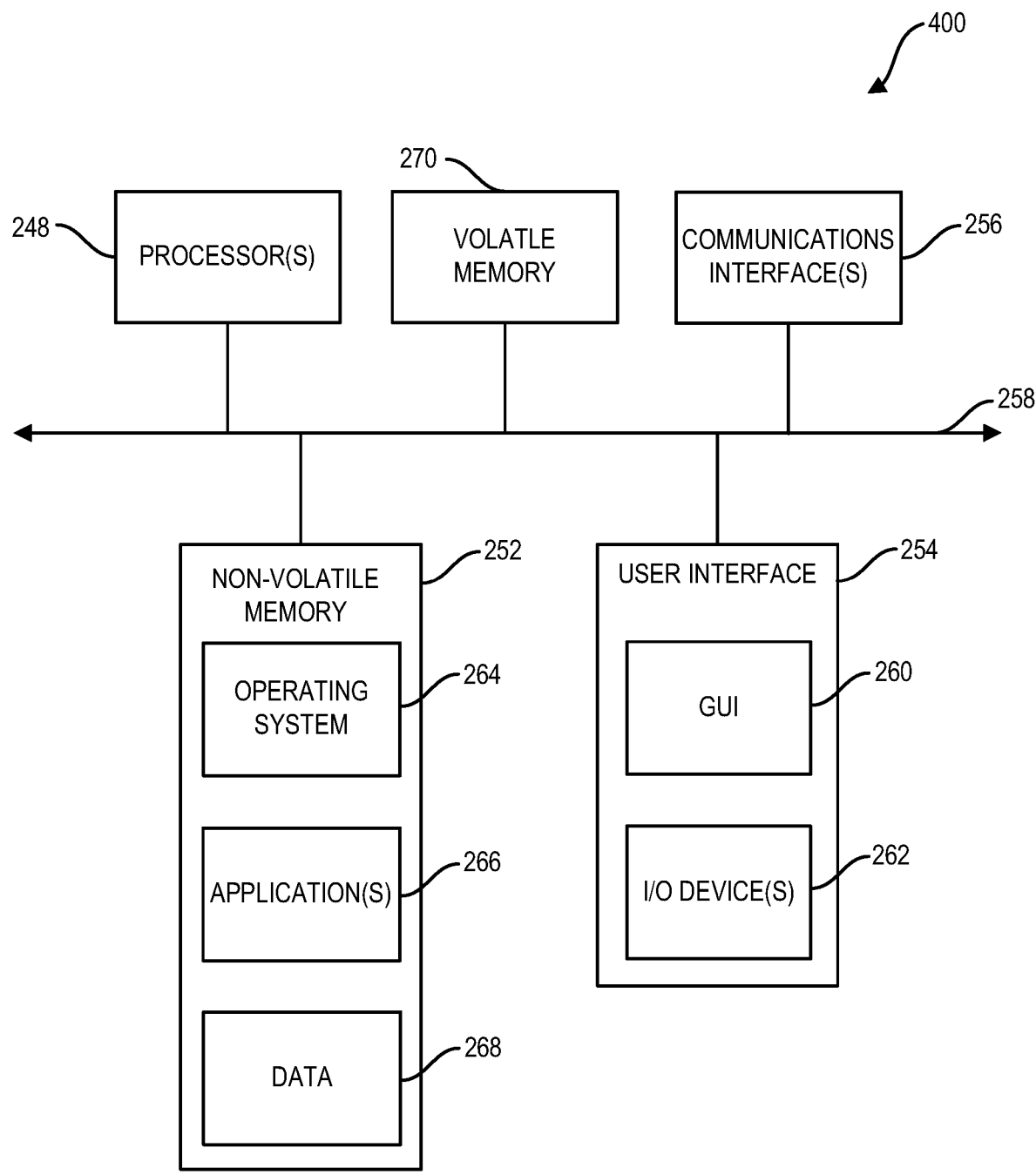
FIG. 3B depicts a block diagram illustrating an example of a computing device, in accordance with some example embodiments.

FIG. 3B depicts a block diagram illustrating an example of a computing device 400, in accordance with some example embodiments. Referring to FIGS. 3A-B, the computing device 400 can be useful for practicing an embodiment of the clients 102, the servers 106, and/or the appliances 108.

As shown in FIG. 3B, the computing device 400 can include one or more processors 248, volatile memory 270 (e.g., RAM), non-volatile memory 252 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), a user interface (UI) 254, one or more communications interfaces 256, and a communication bus 258. The user interface 254 can include a graphical user interface (GUI) 260 (e.g., a touchscreen, a display, and/or the like) and one or more input/output (I/O) devices 262 (e.g., a mouse, a keyboard, and/or the like). In some implementations, the one or more input/output devices 262 can include a front facing camera. The non-volatile memory 252 can store an operating system 264, one or more applications 266, and data 268 such that computer instructions of the operating system 264 and/or applications 266 are executed by the processor(s) 248 out of the volatile memory 270. Data can be entered using an input device of the GUI 260 or received from I/O device(s) 262. Various elements of the computing device 400 can communicate via communication the bus 258. The computing device 400 as shown in FIG. 3B is shown merely as an example, as the clients 102, the servers 106, and the appliances 108 can be implemented by any computing or processing environment and with any type of machine or set of machines that can have suitable hardware and/or software capable of operating as described herein.

The processor(s) 248 can be implemented by one or more programmable processors executing one or more computer programs to perform the functions of the system. As used herein, the term "processor" describes an electronic circuit that performs a function, an operation, or a sequence of operations. The function, operation, or sequence of operations can be hard coded into the electronic circuit or soft coded by way of instructions held in a memory device. A "processor" can perform the function, operation, or sequence of operations using digital values or using analog signals. In some example embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" can be analog, digital or mixed-signal. In some example embodiments, the "processor" can be one or more physical processors or one or more "virtual" (e.g., remotely located or "cloud") processors.

The communications interfaces 256 can include one or more interfaces to enable the computing device 400 to access a computer network such as a local area network (LAN), a wide area network (WAN), a public land mobile network (PLMN), and/or the Internet through a variety of wired and/or wireless or cellular connections.

As noted above, in some example embodiments, one or more computing devices 400 can execute an application on behalf of a user of a client computing device (e.g., the clients 102), can execute a virtual machine, which provides an execution session within which applications execute on behalf of a user or a client computing device (e.g., the clients 102), such as a hosted desktop session, can execute a terminal services session to provide a hosted desktop environment, or can provide access to a computing environment including one or more of: one or more applications, one or more desktop applications, and one or more desktop sessions in which one or more applications can execute.

Figure 4:
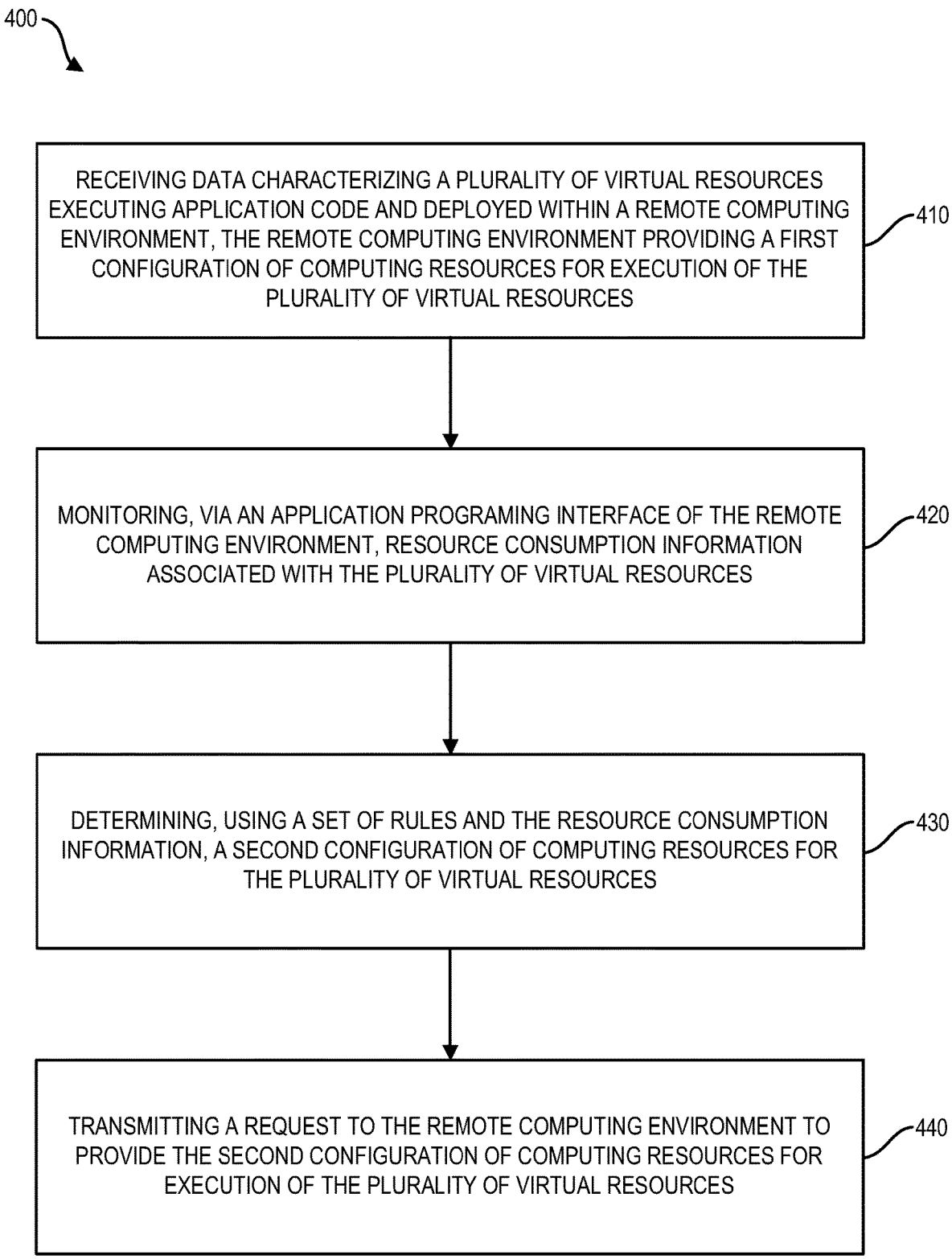
FIG. 4 is a process flow diagram illustrating another example process that can enable a process of monitoring existing cloud resource consumption and, based on the monitoring, determine one or more actions to modify the cloud resource allocation to account for a predicted change in consumption and/or modify which resources are utilized to improve utilization efficiency.

FIG. 4 is a process flow diagram illustrating another example process 400 that can enable a process of monitoring existing cloud resource consumption and, based on the monitoring, determine one or more actions to modify the cloud resource allocation to account for a predicted change in consumption and/or modify which resources are utilized to improve utilization efficiency. By predicting a cloud resource utilization and determining whether a change in resources being utilized would improve efficiency, cloud resource utilization can be improved and costs can be lowered.

At 410, data can be received characterizing a plurality of virtual resources executing application code and deployed within a remote computing environment (e.g., a cloud provider). The plurality of virtual resources can include virtual machines, storage accounts, web applications, databases, and/or virtual networks. The remote computing environment can be providing a first configuration of computing resources for execution of the plurality of virtual resources.

At 420, resource consumption information associated with the plurality of virtual resources can be monitored. The monitoring can be performed via an application programing interface of the remote computing environment. The monitoring can be performed while the remote computing environment is providing the first configuration of computing resources for execution of the plurality of virtual resources.

The resource consumption information can include utilization information, resource information, and cost information. The utilization information can characterize an amount of resources utilized by the plurality of virtual resources. The resource information can characterize a value of a characteristic of the first configuration of computing resources provided by the remote computing environment. The cost information can characterize a cost per unit of a resource.

At 430, a second configuration of computing resources can be determined for the plurality of virtual resources. The determining can be performed using a set of rules and the resource consumption information. The set of rules can include a condition and an action to be provided in response to the condition evaluating as true. The second configuration of computing resources can modify (e.g., increase or decrease) an allocation of the computing resources relative to the first configuration of computing resources. The second configuration of computing resources can modify a type of resource utilized within the remote computing environment relative to the first configuration of computing resources. The determining can include determining a type of remote computing environment as a test environment, a staging environment, and/or a production environment. The determining can include determining a ratio of cost versus utilization for the first configuration.

At 440, a request can be transmitted to the remote computing environment to provide the second configuration of computing resources for execution of the plurality of virtual resources. In some implementations, an alert can be transmitted indicating an over-utilization of the computing resources by the plurality of virtual resources.

One or more aspects or features of the subject matter described herein can be realized in digital electronic circuitry, integrated circuitry, specially designed application-specific integrated circuit (ASIC), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:
1. A method comprising:
receiving data characterizing a plurality of virtual resources executing application code and deployed within a remote computing environment, the remote computing environment providing a first configuration of computing resources for execution of the plurality of virtual resources;
monitoring, via an application programing interface of the remote computing environment, resource consumption information associated with the plurality of virtual resources, wherein the resource consumption information includes cost information characterizing a cost per unit of a resource;

determining, using a set of rules and the resource consumption information, a second configuration of computing resources for the plurality of virtual resources, wherein the determining includes determining a ratio of a cost associated with requesting allocation of the first configuration of computing resources from the remote computing environment versus an actual utilization of the first configuration of computing resources; and transmitting a request to the remote computing environment to provide the second configuration of computing resources for execution of the plurality of virtual resources.

2. The method of claim 1, wherein the monitoring is performed while the remote computing environment is providing the first configuration of computing resources for execution of the plurality of virtual resources.

3. The method of claim 1, wherein the second configuration of computing resources includes changing an allocation of the computing resources relative to the first configuration of computing resources.

4. The method of claim 1, wherein the second configuration of computing resources includes modifying a type of resource utilized within the remote computing environment relative to the first configuration of computing resources.

5. The method of claim 1, further comprising:
transmitting an alert indicating an over-utilization of the computing resources by the plurality of virtual resources.

6. The method of claim 1, wherein the determining includes determining a type of remote computing environment as a test environment, a staging environment, and/or a production environment.

7. The method of claim 1, wherein the set of rules includes a condition and an action to be provided in response to the condition evaluating as true.

8. The method of claim 1, wherein the resource consumption information includes utilization information, and resource information;
the utilization information characterizing an amount of resources utilized by the plurality of virtual resources; and
the resource information characterizing a value of a characteristic of the first configuration of computing resources provided by the remote computing environment.

9. The method of claim 1, wherein the plurality of virtual resources includes virtual machines, storage accounts, web applications, databases, and/or virtual networks.

10. The method of claim 1, wherein the remote computing environment includes an infrastructure as a service platform configured to provide application programming interfaces and supporting pools of hypervisors including virtual machines, the application programming interfaces enabling provision of processing, storage, and/or networks to support operating systems and/or applications.

11. The method of claim 1, wherein the cost of requesting allocation of the first configuration of computing resources includes a predetermined cost for allocating the first configuration of computing resources that is charged by a provider of the remote computing environment.

12. The method of claim 1, further comprising:
transmitting, to a provider of the remote computing environment, a first request to allocate the first configuration of computing resources according to the cost of requesting allocation of the first configuration of computing resources for a period of time.

13. A system comprising:
at least one data processor; and
memory storing instructions, which when executed by the at least one data processor cause the at least one data processor to perform operations comprising:
receiving data characterizing a plurality of virtual resources executing application code and deployed within a remote computing environment, the remote computing environment providing a first configuration of computing resources for execution of the plurality of virtual resources;
monitoring, via an application programing interface of the remote computing environment, resource consumption information associated with the plurality of virtual resources, wherein the resource consumption information includes cost information characterizing a cost per unit of a resource;
determining, using a set of rules and the resource consumption information, a second configuration of computing resources for the plurality of virtual resources, wherein the determining includes determining a ratio of a cost associated with requesting allocation of the first configuration of computing resources from the remote computing environment versus an actual utilization of the first configuration of computing resources; and
transmitting a request to the remote computing environment to provide the second configuration of computing resources for execution of the plurality of virtual resources.

14. The system of claim 13, wherein the monitoring is performed while the remote computing environment is providing the first configuration of computing resources for execution of the plurality of virtual resources.

15. The system of claim 13, wherein the second configuration of computing resources includes changing an allocation of the computing resources relative to the first configuration of computing resources.

16. The system of claim 13, wherein the second configuration of computing resources includes modifying a type of resource utilized within the remote computing environment relative to the first configuration of computing resources.

17. The system of claim 13, the operations further comprising:
transmitting an alert indicating an over-utilization of the computing resources by the plurality of virtual resources.

18. The system of claim 13, wherein the determining includes determining a type of remote computing environment as a test environment, a staging environment, and/or a production environment.

19. The system of claim 13, wherein the set of rules includes a condition and an action to be provided in response to the condition evaluating as true.

20. The system of claim 13, wherein the resource consumption information includes utilization information, and resource information;
the utilization information characterizing an amount of resources utilized by the plurality of virtual resources; and
the resource information characterizing a value of a characteristic of the first configuration of computing resources provided by the remote computing environment.

21. A non-transitory computer readable medium storing computer executable instructions which when executed by at least one data processor forming part of at least one computing system cause the at least one data processor to perform operations comprising:
- receiving data characterizing a plurality of virtual resources executing application code and deployed within a remote computing environment, the remote computing environment providing a first configuration of computing resources for execution of the plurality of virtual resources;
- monitoring, via an application programing interface of the remote computing environment, resource consumption information associated with the plurality of virtual resources, wherein the resource consumption information includes cost information characterizing a cost per unit of a resource;
- determining, using a set of rules and the resource consumption information, a second configuration of computing resources for the plurality of virtual resources, wherein the determining includes determining a ratio of a cost associated with requesting allocation of the first configuration of computing resources from the remote computing environment versus an actual utilization of the first configuration of computing resources; and
- transmitting a request to the remote computing environment to provide the second configuration of computing resources for execution of the plurality of virtual resources.

* * * * *